Sept. 11, 1923.
D. E. AHLERS
BOLT AND NUT LOCK
Filed June 24, 1922
1,467,824
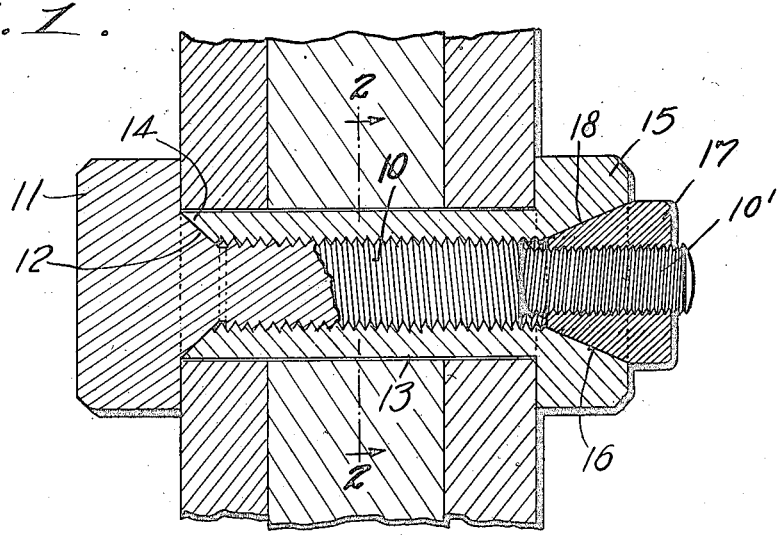
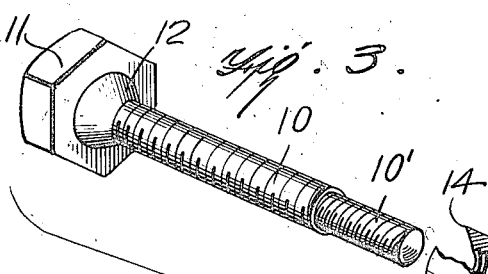
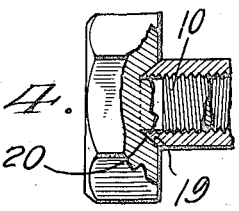
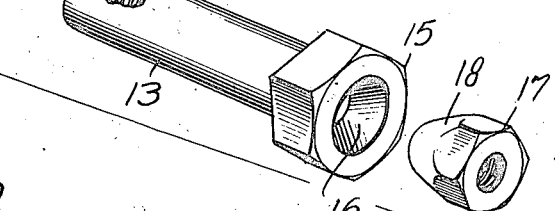
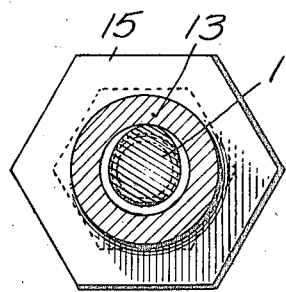
Inventor
DAVID E. AHLERS,
By Franklin H. Hough
Attorney Patented Sept. 11, 1923.

1,467,824

UNITED STATES PATENT OFFICE.

DAVID E. AHLERS, OF CARLISLE, PENNSYLVANIA.

BOLT AND NUT LOCK.

Application filed June 24, 1922. Serial No. 570,689.

*To all whom it may concern:*

Be it known that I, DAVID E. AHLERS, a citizen of the United States, residing at Carlisle, in the county of Cumberland and State of Pennsylvania, have invented certain new and useful Improvements in Bolt and Nut Locks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to bolt and nut locks and has for an object to provide an improved type of lock comprising a threaded bolt and threaded sleeve disposed upon the bolt, with improved means for locking the sleeve and bolt together at opposite ends of the sleeve.

A further object of the invention is to provide in combination with a threaded bolt having a head thereon and a sleeve internally threaded for application to the bolt, of conical connecting means between the ends of the sleeve and the bolt.

A further object of the invention is to provide in combination with a threaded bolt having a head with a conical portion intermediate the thread and the head, of a threaded sleeve having its end tapered complementary to the conical portion of the bolt and its opposite end tapered, with a nut having a conical extremity adapted to be positioned upon the bolt and to occupy the last-mentioned conical inset in the sleeve.

With these and other objects in view the invention comprises certain novel parts, elements, units, combinations, constructions, and functions, as disclosed in the drawing, together with mechanical equivalents thereof, as will be hereinafter more fully described and claimed.

In the drawings:

Figure 1 is a view in longitudinal substantially diametrical section, of the bolt and nut lock assembled;

Figure 2 is a transverse sectional view through the sleeve and bolt, as indicated by line 2—2 of Figure 1;

Figure 3 is a perspective view of the units of the lock separated;

Figure 4 is a sectional view substantially diametrical of the lock showing a type modified as compared with the type shown at Figure 1.

Like characters of reference indicate corresponding parts throughout the several views.

In the preferred type of nut lock as shown at Figures 1, 2 and 3, a threaded bolt 10 is employed of substantially the usual and ordinary type, having a head 11 with a tapered or substantially conical portion 12 intermediate the head and the threaded portion of the bolt and a reversely threaded section 10' at the end.

A sleeve 13 is provided internally screw-threaded to correspond to the threads of the bolt and having at one end an inset tapered bore, indicated at 14, the taper of which corresponds to the conicality of the cone 12.

At the end opposite the said inset taper the sleeve is provided with a head 15, the said head 15 and head 11 preferably, though not necessarily, corresponding to each other and being similar and shown in the drawings as being hexagonal, although the invention is in no way limited to the uniformity, either as to size or similarity as to the multiangular formation.

In the end of the sleeve provided with the head 15 an inset taper 16 is formed and a nut 17 is provided having a conical end 18 complementary to the taper 16 of the head 15 and a thread complementary to the threaded portion 10'.

In assembling the device in operative position the sleeve 13 is first inserted through the parts to be connected and through an opening proportioned to receive said sleeve until the head 15 comes into engagement with one side of the body.

The bolt is now inserted by inserting the threaded portion 10 into the sleeve and is screwed home in any usual and ordinary manner, as by the application of a wrench or the like to the head 11. As occasion may require either the head 11 or the head 15 may receive the wrench or a similar article, as it is obvious that either the rotation of the bolt or the sleeve will accomplish the same purpose of tightening the two members relative to each other.

The device being tightened to exert the required pressure upon the body interposed between the heads 11 and 15 and to seat the cone 12 in the taper 14, the stress is maintained by applying the nut 17 to the reversely threaded end 10' of the bolt extending beyond the head 15 until the conical portion 18 of said nut is firmly seated in the taper 16 of the head 15. By reason of this tapered engagement great binding force is exerted which will prevent retro-action of the nut 17 under ordinary conditions of use, including excessive jar, vibration and the like.

As shown at Figure 4 the device is modified by forming the end of the sleeve 13 with a cone or conical portion 19 and the head 11 is provided with an inset conical taper 20 complementary to the conical end of the sleeve. In either case the connection between the head of the bolt and the end of the sleeve is the connection of a cone in a tapered socket; whereby the tendency to return is largely obviated.

What I claim is:

1. A nut lock comprising a threaded bolt having a tapered portion connecting the threaded bolt and head, a sleeve having a taper formed at its end complementary to the taper adjacent the head and having an inset tapered socket at its opposite end, and a nut positioned upon the end of the bolt having a conical portion positioned in said last-mentioned tapered socket.

2. A nut lock comprising a bolt having a threaded shank and a head, a tapered part forming connection between the threaded part and the head, an internally screw-threaded sleeve proportioned for position upon the threaded portion of the bolt and shorter than said threaded portion and having one extremity formed complementary to the taper of the bolt, said sleeve being also provided with a tapered socket in its opposite end and a nut positioned upon the bolt, said nut having a tapered portion inserted into the tapered socket of the sleeve.

3. A nut lock comprising a bolt including a threaded shank, a head and a conical portion interposed between the head and the threaded portion, an internally screw-threaded sleeve having its opposite ends provided with conically tapered sockets, one of said sockets being proportioned complementary to the conical portion of the bolt, and a nut having a conical extremity proportioned complementary to the tapered socket in the opposite end of said sleeve and internally screw-threaded to occupy a position upon the extremity of the shank of the bolt and within said tapered socket.

In testimony whereof I hereunto affix my signature.

DAVID E. AHLERS.